3,705,908
PROCESS FOR PREPARING 2-FORMYL-2-LOWER ALKYL 1,3-DITHIOLANES AND 1,3-DITHIANES
Charles M. Leir, Woodbury, Minn., assignor to Minnesota Mining and Manufacturing Company, St. Paul, Minn.
No Drawing. Filed June 28, 1971, Ser. No. 157,719
Int. Cl. C07d 71/00, 73/00
U.S. Cl. 260—327 M                3 Claims

ABSTRACT OF THE DISCLOSURE

Process for the preparation of a dithiolane or dithiane compound substituted at the 2 carbon atom by both an aldehyde group and a lower alkyl group, which comprises converting an alkylene dithiol or alkylene dithiol di- or monoacetate to an alkylene disulfenyl halide then reacting the halide with an aldehyde of 3 to 6 carbon atoms in a suitable solvent.

FIELD OF THE INVENTION

This invention is concerned with processes for the preparation of aldehyde-group-containing intermediates for carbamoyloxime-group-containing insecticides.

BACKGROUND OF THE INVENTION

It is known that compounds like those prepared by the process of the invention can be prepared by the reaction of α,β-ketoaldehydes with dithiols. Although this method is generally useful for such synthesis, many of the necessary α,β-ketoaldehyde starting materials are difficult to obtain, and those few which are commercially available are relatively expensive. Reference is made to the Ph. D. thesis of Tomas L. Fridinger, University of Maryland, 1967, and Angewandte Chemie, International Edition, 4, 1075 (1965), as well as to T. L. Fridinger, J. Het. Chem. (in press).

It is an object of this invention to utilize the more readily available aldehydes as intermediates in the synthesis of dithiolane or dithiane compounds.

DETAILED DESCRIPTION OF THE INVENTION

This invention relates to the preparation of compounds of the formula

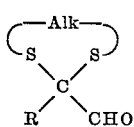

wherein R represents alkyl of one to four carbon atoms and Alk is an alkylene chain of two or three carbon atoms connecting the sulfur atoms, optionally substituted by one or two alkyl groups of one to four carbon atoms when Alk is two carbon atoms, and one to three alkyl groups of one to four carbon atoms when Alk is three carbon atoms.

In the novel process of the invention, an alkylene dithiol di- or monoacetate, or an alkylene dithio, is reacted in a first step with a halogenating agent e.g. a chlorinating or brominating agent to give an alkylene disulfenyl halide of the formula X—S—Alk—S—X, wherein Alk is defined hereinabove, and X is chlorine or bromine and then an aliphatic aldehyde having three to six carbon atoms is reacted with the alkylene disulfenyl halide product of step 1 to produce the desired final product.

The reactions which take place are illustrated by the following equations:

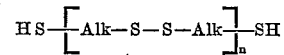
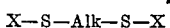
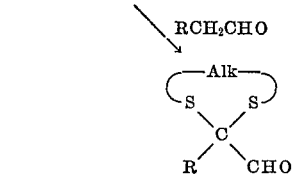

Preferably, an alkylene dithiol is used in the reaction of step 1. The halogenating agent may be chlorine gas or sulfuryl chloride, or bromine or sulfuryl bromide. Halogenation is generally carried out below room temperature, for example at −10 to 0° C. when sulfuryl chloride is used. The exact temperature depends on the dithiol chosen, since some are more reactive than others, but temperatures from −80° C. to 50° C. are suitable. The chlorinating agent is routinely added to the dithiol at about 0° C., then the reaction mixture is allowed to come to about 25° C. or higher while the mixture is stirred for up to one hour.

The reaction of step 1 occurs in two stages. During the first stage, one-half equivalent of halogenating agent per sulfur atom is used, hydrogen halide is formed as a by-product and a polymeric material theorized to be linked by disulfide linkages is formed. In the second stage, the polymeric material reacts with one-half equivalent of halogenating agent per sulfur atom to form the monomeric alkylene disulfenyl halide intermediate. Either the polymer or the disulfenyl halide compound may be isolated if desired. It is generally preferred to react the intermediates formed without isolation in order to reduce the physical manipulation necessary.

Step 1 is carried out in an inert organic solvent, i.e. one which does not react to any substantially extent with the halogenating agent or the alkylene disulfenyl halide under the conditions of the reaction. The solvent must therefore be free from Zerewitinoff hydrogen. Suitable solvents include esters of lower alkyl carboxylic acids such as methyl formate, ethyl acetate and the like, halogenated hydrocarbons, preferably partially chlorinated such as dichloromethane, dichloroethane, chloroform and trichloroethylene; liquid sulfur dioxide, nitromethane and the like. Acetone and benzene are somewhat less useful solvents for the reaction. Aromatic hydrocarbons are not preferred because they are likely to react with the halogenating agent; similarly, compounds containing Zerewitinoff hydrogen are likely to react with the halogenating agent and/or the intermediate alkylene sulfenyl halide and are therefore generally to be avoided.

It is not necessary that the solvent be the same for both step 1 and step 2. Indeed, different solvents can also be used for the two stages of step 1 if desired, as it has been found in actual experiments that the solvent of step 1 may be removed and a new solvent used for step 2. However, if the solvent of step 1 is also suitable for step 2, as shown by the fact that the yield of the product heterocyclic compound is high, according to analysis, for example, by vapor phase chromatography, step 2 can be carried out without isolating the intermediate alkylene sulfenyl halide. Such solvents are ethyl acetate, dichloromethane and chloroform, and are presently preferred for use in the process of the invention.

For completion, the reaction of step 1 requires at least two equivalents of halogenating agent per mole of dithiol. Smaller amounts result in lower yields. Although excess halogenating agent can be used, it is preferred to have little or no excess, as an excess may halogenate the groups R and Alk in ordinarily undesirable side reactions.

Step 1 is generally run at atmospheric pressure, and may be carried out under an inert atmosphere if desired, but this has not been found to be necessary.

To insure complete reaction of the disulfenyl halide, it has been found that the reaction time must be eight hours or more. Reaction times from 8 to 36 or more hours are satisfactory. It is of course known that increasing the reaction temperature reduces the time necessary for completion.

For use as starting materials, alkylene dithiols wherein Alk has two carbon atoms connecting the sulfur atoms are presently preferred, and most preferred, because the final product is the valuable chemical intermediate, 2,4-dimethyl-2-formyl-1,3-dithiolane, is 1,2-propanedithiol.

The reaction of step 1 gives very high yields, over 90 percent, of the intermediate alkylene disulfenyl halide.

The reaction of the second step requires one mole of aldehyde per mole of intermediate alkylene sulfenyl halide. Although this 1:1 ratio can be varied, with somewhat deleterious effects on the yield of product, it is presently preferred to use the equimolar ratios.

Aldehydes having the formula

RCH$_2$CHO wherein R is methyl or ethyl are presently preferred as reactants; propionaldehyde is most preferred because the dithiolane and dithiane compounds prepared from it provide more active carbamoyl-oxime-group-containing insecticides.

The choice of solvent for the second reaction step is critical, because the solvent must be substantially nonreactive with the sulfenyl halide group. Suitable inert solvents for this purpose are esters of lower alkyl carboxylic acids such as methyl formate, ethyl acetate, ethyl formate, methyl acetate and methyl propionate; and partially chlorinated hydrocarbons such as dichloromethane, chloroform and dichloroethane. Most preferred is ethyl acetate.

The reaction of step 2 is preferably run under anhydrous conditions, but the use of an inert atmosphere is not necessary. The reaction is ordinarily run at atmospheric pressure, but higher pressures can be used if desired.

The second step is usually carried out at temperatures in the range of about −80° C. to 30° C., e.g., by adding the aldehyde to cold (0 to −5° C.) alkylene sulfenyl halide in solution in the selected solvent, stirring the mixture for several hours to 0 to −5° C., then stirring the mixtures at about 25° C. for several additional hours. Higher temperatures may bring about undesirable side reactions. Reaction times from one to one hundred hours are useful. Ten to twelve hours is sufficient time for quantities of the order of one mole of each reactant.

The final product, a liquid, is conveniently isolated from the reaction mixture by fractional distillation or extraction with immiscible solvents followed by distillation.

The product dithiolane and dithiane aldehydes prepared by the process of the invention are useful for the preparation of oximes which may be carbamoylated, for example with methyl isocyanate, to give compounds which are known insecticides, miticides and nematicides. Aldehydes of the type prepared by the process of the invention having six to sixteen carbon atoms are commonly used as components of scents and perfumes.

The following non-limiting examples are given to illustrate the process of the invention.

EXAMPLE 1

To a solution of 1,2-propanedithiol (1.0 mole, 108 g.) in ethyl acetate (1 liter) at 0 to 5° C. is added sulfuryl chloride (2.0 mole, 270 g.) dropwise, with stirring, over one hour. After addition is complete, the solution is allowed to warm to room temperature over a one hour period.

After cooling the mixture to −5 to 0° C., propionaldehyde (1.0 mole, 58 g.) is added dropwise, with stirring, over a one hour period. Stirring is continued for five hours, then the reaction mixture is allowed to warm to room temperature overnight. The solvent and volatile by-products are removed by evaporation under reduced pressure (10–20 mm. Hg), then the dark oily residue is distilled under high vacuum to give 93.5 g. of 2,4-dimethyl-2-formyl-1,3-dithiolane as a yellow oil, B.P. 90–130° C./1 mm. of mercury. The purity of the product, checked by vapor phase chromatography, is found to be better than 95 percent.

Compounds which are made by the process of the present invention are given in the following table. The process conditions are essentially those given in Example 1.

TABLE I

| Example No. | Starting materials | | Product |
|---|---|---|---|
| | Dithiol | Aldehyde | |
| 2 | 1,2-propanedithiol | n-Hexanal | 2-formyl-2-(n-butyl)-4-methyl-1,3-dithiolane. |
| 3 | 1,3-propanedithiol | Propionaldehyde | 2-formyl-2-methyl-1,3-dithiane. |
| 4 | 1,3-dimethyl-1,3-propanedithiol | do | 2-formyl-2,4,6-trimethyl-1,3-dithiane. |
| 5 | 1-methyl-1,3-propanedithiol | do | 2-formyl-2,4-dimethyl-1,3-dithiane. |
| 6 | 1-ethyl-1,2-propanedithiol | do | 4-ethyl-2-formyl-2-methyl-1,3-dithiolane. |
| 7 | 1-(n-butyl)-1,2-propanedithiol | do | 4-(n-butyl)-2-formyl-2-methyl-1,3-dithiolane. |
| 8 | 1,1-dimethyl-1,2-propanedithiol | do | 2-formyl-2,4,4-trimethyl-1,3-dithiolane. |
| 9 | 1,2-ethanedithiol [1] | Butyraldehyde | 2-ethyl-2-formyl-1,3-dithiolane. |
| 10 | do | Propionaldehyde | 2-formyl-2-methyl-1,3-dithiolane. |
| 11 | do | Isovaleraldehyde | 2-isopropyl-2-formyl-1,3-dithiolane. |
| 12 | 1,2-propanedithiol [1] | Butyraldehyde | 2-ethyl-4-methyl-2-formyl-1,3-dithiolane. |
| 13 | do | Isovaleraldehyde | 2-isopropyl-4-methyl-2-formyl-1,3-dithiolane. |

[1] Dichloromethane used as the solvent.

What is claimed is:

1. Process for the preparation of a heterocyclic compound having the formula

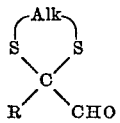

wherein R is alkyl of one to four carbon atoms, Alk is an alkylene chain of two or three carbon atoms connecting the sulfur atoms, optionally substituted by one or two alkyl groups of one to four carbon atoms when Alk is two carbon atoms, and one to three alkyl groups of one to four carbon atoms when Alk is three carbon atoms, comprising the steps of (1) reacting a compound selected from the group

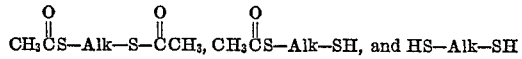

wherein Alk is as defined above with a halogenating agent to give a disulfenyl halide having the formula X—S—Alk—S—X, wherein X is chlorine or bromine at a temperature in the range of about −80° to 50° C. and (2) reacting an aldehyde having the formula R—$CH_2$CHO, wherein R is as defined above, with the said disulfenyl halide, in the presence of an inert solvent containing substantially no Zerewitinoff-active hydrogen, at a temperature in the range of about −80° to 30° C.

2. Process of claim 1 wherein the solvent for step 2 is a chlorinated hydrocarbon or the ester of a lower carboxylic ester.

3. Process according to claim 1 in which R is $CH_3$, and the dithiol is 1,2-propanedithiol.

References Cited
FOREIGN PATENTS 1,941,999   2/1970   Germany _____ 260—327 M HENRY R. JILES, Primary Examiner R. T. BOND, Assistant Examiner